May 1, 1962  C. BURNS  3,031,916
OPTICAL MEASUREMENT OF OBJECTS
Filed March 31, 1958  3 Sheets-Sheet 1
FIG. 1.
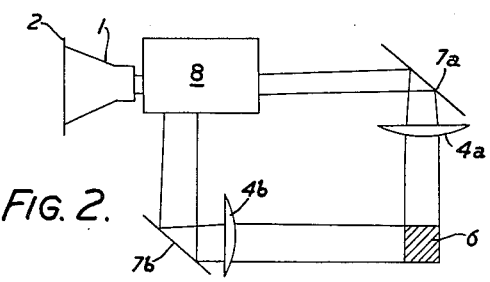
FIG. 2.
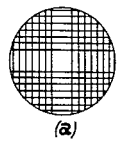
(a)
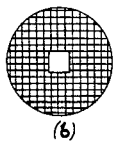
(b)
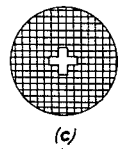
(c)
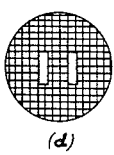
(d)
FIG. 3.
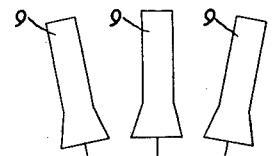
FIG. 4.
(i)
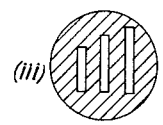
(ii)
(iii)
INVENTOR
Charles Burns
BY
Pierce, Scheffler & Parker
ATTORNEYS May 1, 1962 C. BURNS 3,031,916
OPTICAL MEASUREMENT OF OBJECTS
Filed March 31, 1958 3 Sheets-Sheet 2

INVENTOR
Charles Burns
BY
Pierce, Scheffler & Parker
ATTORNEYS

United States Patent Office 3,031,916
Patented May 1, 1962

3,031,916
OPTICAL MEASUREMENT OF OBJECTS
Charles Burns, Worcester Park, England, assignor to The British Iron & Steel Research Association, London, England
Filed Mar. 31, 1958, Ser. No. 725,365
Claims priority, application Great Britain Apr. 1, 1957
8 Claims. (Cl. 88—14)

This invention relates to the measurement of objects, and particularly to the measurement of objects which by their nature or location cannot conveniently be measured by instruments which require contact with them.

The invention has application in the measuring or gauging of dimensions such as cross sectional area of, for instance, a hot metal billet, the temperature of which renders difficult or even impossible measurement by conventional in-contact methods.

It is the object of the invention to provide an improved method and means of measuring or gauging dimensions of objects not involving contact with such objects which is independent of minor variations in movement of an object whilst being measured or gauged.

According to the aspect of the invention an arrangement comprises a lens system adapted to form in its focal plane an image of a three dimensional field of view on a projection centered at infinity, means for aligning the system with its optical axis perpendicular to the dimension to be measured, and means disposed to receive said image for measurement thereof.

Figure 5:
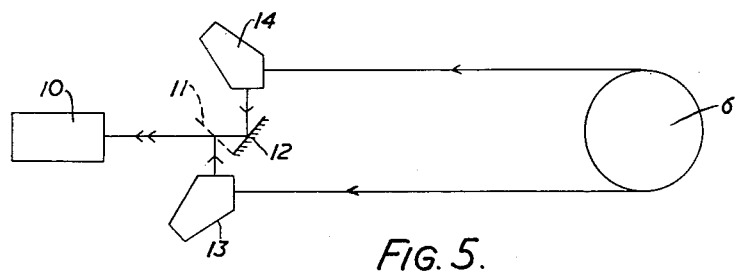
Figure 7:
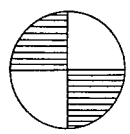
Figure 8:
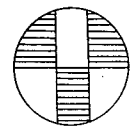
Figure 9:
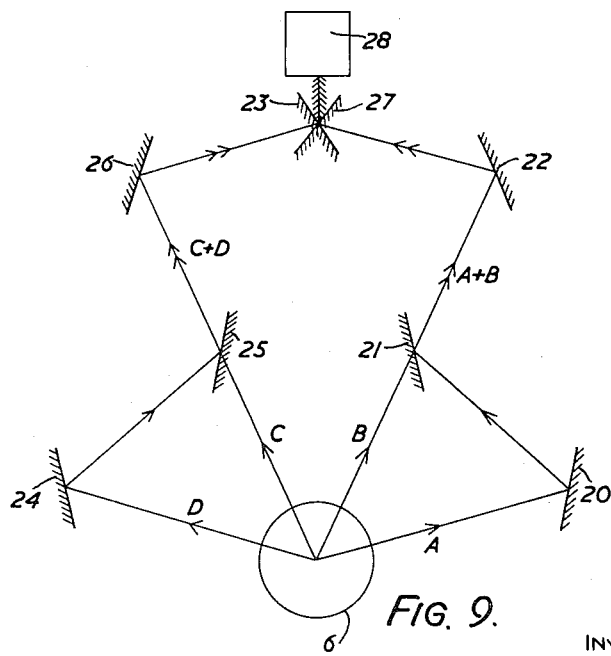
Figure 10:
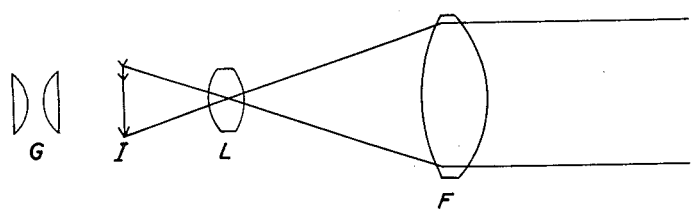
Figure 11:
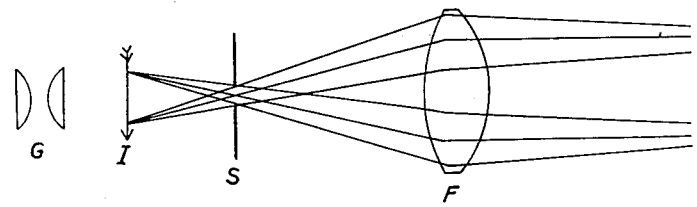

The various features and advantages of the invention will be apparent from the following description of a number of embodiments given by way of example and illustrated in the accompanying drawings of which:

FIGURE 1 shows schematically the optical arrangements of a system for measuring a single dimension of a billet, FIGURE 2 shows schematically the optical arrangements of a system for measuring the cross section of a moving billet, FIGURE 3 shows various images obtainable with apparatus in accordance with FIGURE 2, FIGURE 4 shows schematically the optical arrangements of a system for gauging trapezoidal error in a rectangular billet and the displays obtained in different cases, FIGURE 5 shows a modification of the system of FIGURE 1, FIGURES 6, 7 and 8 show various images obtainable with the system of FIGURE 5, FIGURE 9 shows a further modification of the system of FIGURE 1 for measuring a plurality of dimensions, and FIGURES 10 and 11 show two forms of the lens system employed.

Referring now to FIGURE 1, the system comprises a camera 1, with an image screen 2 and an image forming lens 3, and a further lens 4 which will be referred to as a field lens. The two lenses 3 and 4 comprise a lens system which forms an image of a three dimensional field of view on a projection centered at infinity. Solid objects are accordingly portrayed without their apparent size being affected by variations in distance, within the focal depth of the system, from the image forming lens.

The lens 3 is sited at the focal point of the field lens 4 the diameter of which is slightly wider than the field of view to be covered. With the object to be gauged or measured placed at a distance from lens 4 approximately equal to the focal length of lens 4, the lens 3 can be operated at infinity focus. The width of the image 5 is proportional to the projected width of the object 6 which for instance is a hot metal billet moving past the system in the direction of the length of the billet, at right angles to the optical axis.

Thus with an object 6 of rectangular section as shown and with the optical axis parallel to one side of the object the width of the image 5 is proportional to the length of the other side of the object. If the object is non-rectangular the width of the image is proportional to the height of the object perpendicular to the optical axis.

The image displayed on the screen 2 can be gauged or measured by conventional means and the accuracy of such measurement is not affected by variations in the distance between the object 5 and the lens 3 which are difficult to avoid in guiding the movement of a hot billet without unduly impeding such movement.

Referring now to FIGURE 2, there is here shown an arrangement for superposing the images of the type produced by the system of FIGURE 1, so as to produce an image imitating the cross section of an object. The same references identify the same integers in both FIGURES 1 and 2.

The rectangular billet constituting the object 6 is, in this embodiment, viewed from two directions at right angles to each other, the optical axis of each system being parallel to one side of the billet. Two field lenses 4a and 4b are employed each backed by a corresponding mirror, 7a and 7b respectively disposed at 45° to the corresponding optical axis so as to reflect the images into an image mixing unit 8 disposed in front of the camera 1. The image mixing unit comprises mirrors and a half reflecting plate arranged to rotate one image through 90° with respect to the other so that a crossed superposed image is produced.

Alternatively television cameras, of the image orthicon type for instance may be used in place of the mirrors 7a and 7b and an electronic mixing unit may then be used. This would have the advantage of rendering the two optical systems less interdependent. The output of the mixing unit can be applied to a display tube or to apparatus for electronically effecting quantitative evalution of the image area using the "television microscope" technique.

Some examples of image displays obtainable with the system of FIGURE 2 are shown in FIGURE 3. Thus 3(a) indicates the crossed superposed image referred to, in which the centre portion being doubly illuminated stands out brighter than the surrounding image. This effect can be enhanced by contrast control to produce an image as shown at 3(b).

By placing a slit in front of each field lens 4 a crossed superposed image of the type shown in 3(c) can be obtained. By modifying the mixing unit a side by side representation of the two slit images may be obtained as shown in 3(d).

Referring now to FIGURE 4, there is here shown a system for gauging trapezoidal error utilizing three optical systems disposed with an angle α between each of the outer systems and the inner one. For simplicity of illustration each system has been shown as a single camera 9 but it is to be understood that each comprises a system of the type shown in FIGURE 1 with slits in front of each field lens and with a single display screen. The systems are arranged for side by side display of the split images and the displays shown at 4(i), 4(ii) and 4(iii) correspond respectively to absence of trapezoidal error, departure from rectangularity less than α and departure greater than α.

It will be appreciated that whilst in the foregoing description the object has been in each case a billet of rectangular section, the invention is not limited in its application to the measurement or gauging of rectangular sections alone but can be used with objects of any section. Moreover, the basic system described can readily be adapted to provide for exercising a control effect, or actuating an alarm, upon detection of departure from predetermined dimensions of the object being measured or gauged.

The single camera system of FIGURE 1 can also be utilized for producing an accurate representation of the cross section of uniform or non-uniform bodies by producing relative rotation between the system and the object or body in such a manner that a succession of images are formed, the successive images being superimposed to build up a composite representation of the cross-sectional profile provided this includes no re-entrant surfaces.

Superimposition can readily be achieved using well known photographic or radar display techniques in conjunction with respectively a cine or television camera. In the former case a large number, say 90 exposures are made and the images obtained upon processing the film are optically superimposed. Providing there is adequate contrast between a dark object and a light background the background portions of successively formed images will when simultaneously superimposed obscure the peripheral parts of the individual images and leave a central unobscured image which portrays the cross section of the object examined. Alternatively all the exposures may be made successively upon a single photographic plate with relative rotation between each exposure.

Similarly, employing a television camera which conventionally produces 50 pictures a second the production of 90 separate images would take less than two seconds and the necessary relative rotation between system and object can readily be effected in this period. In this case the object and background may be the same as in the photographic method or the object may be light and the background dark and inversion effected electronically. The images are produced on a cathode ray tube screen having a sufficiently long afterglow to effect superimposition of the successive images which are angularly displaced relative to one another in synchronism with the relative rotation between system and object in the manner of the well known radar plan position indicator display.

The relative rotation can be effected by rotating the camera system relative to the object through 180° for example by moving it on a semicircular track having the object disposed at the centre of its circle. Alternatively the object can be rotated through 180° or both camera system and object can be in opposite directions through supplementary angles. Again if more than one camera system is employed the angle of rotation of the object can be reduced.

When a television camera system is employed the composite image produced on the display tube may be photographed for detailed examination. The profile investigation system described above and the arrangements of FIGS. 2 and 3, 4 and 9 contain a characterizing feature; namely, that in each of these cases, at least two views of an object are taken, each view being through an optical system which is "object-side telecentric." The term "optical system which is object-side telecentric" refers to an optical system of a kind which, when arranged to view in a given direction a three-dimensional object which is spaced from the optical system and which lies within the depth of field of the optical system, forms in an image plane an image of that object, which image has the form of a projectional view, centered at infinity, of the object in the given direction.

A modification of the system of FIGURE 1 to provide direct measurement of a dimension of an object which is larger than the practicable diameter of the optical components of the system is shown in FIGURE 5. In this figure the object 6 is viewed by means of a camera and lens system 10 which is the same as that constituted by the numbers 1, 2, 3 and 4 of FIGURE 1. In front of the system 10 are disposed a half silvered mirror 11 and a fully silvered mirror 12 on to which images of object 6 are directed by two pentagonal prisms 13 and 14 respectively. Simple mirrors arranged at 45° to the horizontal, 90° prisms or pairs of mirrors may be used in place of the pentagonal prisms and whatever is used at 13, 14 is mounted for controlled movement in a direction perpendicular to the axis of the system 10 and in relation to a fixed scale (not shown).

Figure 6:
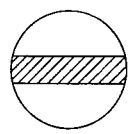

The image produced in the system 10 is as shown in FIGURE 6 and by adjusting the positions of either or both prisms 13 and 14 the boundaries of the upper and lower images can be brought together. With the images positioned in this manner the spacing between 13 and 14 as indicated directly on the scale is equal to the diameter of the object 6.

The adjustment of the image positions may also be effected by moving the mirrors 11 and 12 along the axis of system 10 provided the members 13 and 14 are sufficiently extensive to provide images at various points along this axis which can be directed into the system 10 by the mirrors 11 and 12. If the object 6 can be located symmetrically with respect to 13 and 14 this adjustment of mirrors 11 and 12 can be used as the sole adjustment and the positions of these mirrors measured by reference to a fixed scale (not shown) along which they are adjusted. A further modification is to use two fully silvered mirrors at 11 and 12 the two being positioned side by side and the members 13 and 14 being correspondingly positioned to direct images into the side by side mirrors. The composite image produced by the system 10 in this case is as shown in FIGURE 7 and adjustment of 13 and 14 is effected to bring the upper edge of one half of the image into alignment with the lower edge of the other half of the image to measure the dimension of the object 6.

Instead of a side by side arrangement of the mirrors 11 and 12 one of the mirrors may be narrow in relation to the other so that in the composite image produced in system 10 the image of one edge of the object interrupts the image of the other edge as shown in FIGURE 8. In this case also alignment of the upper edge of the interposed image with the lower edge of the interrupted image is an indication of correct adjustment of 13 and 14.

Whilst the arrangement illustrated in FIGURE 5 and the modifications thereof have been described in connection with measurement of dimension of the object 6, it will be appreciated that these arrangements also provide an indication of variation from a predetermined measurement in the same way as the arrangements of the earlier figures. Thus with the members 13 and 14 or the members 11 and 12 correctly adjusted for a predetermined dimension measurement, overlap and spacing between the parts of the composite image will indicate departure from the predetermined dimension in opposite senses.

Instead of using a plurality of lens systems as in the arrangement of FIGURE 4 mirrors may be used to direct images from a plurality of view points into a single lens system. This modification is shown in FIGURE 9.

In this modification the object 6 is viewed from four points each spaced by 45° from the next. Eight mirrors 20–27 are used to combine the four images indicated schematically as the four beams A, B, C and D. As will be seen from the figure beam A is reflected by mirror 20 on to mirror 21 and is then reflected together with and parallel to beam B (which passes clear of mirror 21) on to mirror 22. Mirror 22 reflects both beams A and B on to mirror 23 which reflects the beams parallel to the axis of the single lens system 28. Similarly beams C and D are reflected by the identical system of mirrors 24–27 so that all four beams A, B, C and D enter the lens system 28.

A side by side presentation of the four images can be used as indicated in FIGURE 4 or the bottom and top edges of the four images may be transposed in the manner shown for one image in FIGURE 6. This latter form of presentation will of course involve a modification of the arrangement of FIGURE 9 in the manner shown in FIGURE 5. FIGURES 10 and 11 show two forms of the lens system used in the various embodiments of the invention described in connection with the earlier figures.

In FIGURE 10 F indicates the field lens at the focal point of which is located an image forming lens L. The image is diagrammatically indicated at I and G represents the eyepiece if the system is being used for visual observation. If a photographic or television observation is to be made the eyepiece G is not used and the photographic plate or film, or the photocathode of a television camera is positioned at I. In the latter two cases the image forming lens L may be constituted by the lens of the photographic or television camera.

In FIGURE 11 G, I and F represent the eyepiece, image and field lens as in FIGURE 10 but a stop S is placed at the focal point of lens F. With this arrangement provided the object is at a distance from F equal to several times the focal length of F, the functions of both F and L will be performed by the lens F and the stop S ensures that the image I will be similar to that produced by the system of FIGURE 10.

I claim:
1. A method of gauging a dimension of a moving object, such as a hot billet, having transverse as well as longitudinal movement, at successive points along the axis of longitudinal movement of said object and in a direction transverse to the axis of longitudinal movement of said object, comprising the steps of directing the optical axis of an object-side telecentric lens system perpendicular to the axis of longitudinal movement of said object to provide an image of said object displaying the said object to provide an image of said object displaying the said dimension, and gauging the dimension of said object from said image, whereby changes in distance of said object from said lens system in a direction transverse to the said axis of longitudinal movement are ineffective to change the size of said image and hence, said gauged dimension.

2. A method of gauging a dimension of a moving object, such as a hot billet, having transverse as well as longitudinal movement, at successive points along the axis of longitudinal movement of said object and in a direction transverse to the axis of longitudinal movement of said object, comprising the steps of directing the optical axis of an object-side telecentric lens system perpendicular to the axis of longitudinal movement of said object, masking said telecentric lens system to provide an image of the two opposite edges of said object at the ends of said dimension, such that the opposite extremities of said image are spaced apart by a distance proportional to the actual magnitude of said dimension of said object, and gauging said dimension of said object from the spacing of said image extremities, whereby changes in distance of said object from said lens system in a direction transverse to the said axis of longitudinal movement are ineffective to change the size of said image and hence, said gauged dimension.

3. A method of gauging a dimension of a moving object, such as a hot billet, having transverse as well as longitudinal movement, at successive points along the axis of longitudinal movement of said object and in a direction transverse to the axis of longitudinal movement of said object, comprising the steps of directing an object-side telecentric lens system having two parallel optical axes perpendicular to the axis of longitudinal movement of said object to provide an image of the object displaying said dimension, masking said lens system to mask off the central part of said object whereby said image comprises separate partial images of two opposite extremities of said object in the direction of said dimension, adjusting the distance between said axes to bring about a predetermined relationship between said partial images and gauging said dimension of said object from the degree of adjustment of said axes, whereby changes in distance of said object from said lens system in a direction transverse to the said axis of longitudinal movement are ineffective to change the relationship of said partial images as determined by the adjustment of the distance between said axes and hence said gauged dimension.

4. The method as claimed in claim 3 including inverting one of said partial images relative to the other, whereby adjustment of the distance between said axes will produce coincidence between edges of said partial images corresponding to opposite edges of said object in the direction of said dimension.

5. A method of measuring two mutually perpendicular dimensions of a moving object, such as a hot billet, having transverse as well as longitudinal movement, at successive points along the axis of longitudinal movement of said object, said dimensions lying in a plane perpendicular to the axis of said longitudinal movement of said object, comprising the steps of directing an object-side telecentric lens system, having two field lenses and two mutually perpendicular optical axes, with each of said optical axes perpendicular to said axis of longitudinal movement and with each of said two dimensions lying wholly in the field of a different one of said two field lenses, arranging said lens system to provide two images in a single image field, each image including the opposite extremities of said object in the direction of a different one of said two dimensions so as to produce in a single image field two images of said object each having a dimension proportional to a different one of said two dimensions of said object, and measuring said two dimensions of said object from said two images, whereby changes in distance of said object from said lens system in a direction transverse to said axis of longitudinal movement are ineffective to change the sizes of said two images and hence the measured dimensions.

6. A method of gauging trapezoidal error in the cross section of a moving object such as a hot billet, having transverse as well as longitudinal movement at successive points along the axis of such longitudinal movement, said cross section being perpendicular to the axis of said longitudinal movement, said method comprising the steps of arranging at least three spaced apart object-side telecentric slit-apertured lens systems in a plane which is perpendicular to said axis of longitudinal movement, directing the optical axes of said spaced apart object-side telecentric lens systems perpendicular to the axis of longitudinal movement of said object to converge toward said axis of longitudinal movement, combining the images of each of said lens systems to provide in a single image field three slit images each corresponding to the dimension of said object in a direction perpendicular to a different one of said optical axes and also perpendicular to said axis of longitudinal movement, and gauging trapezoidal error from the relative sizes of said slit images whereby changes in distance of said object from said lens systems in a direction transverse to said axis of longitudinal movement are ineffective to change the sizes of said slit images and hence the gauged error.

7. A method of gauging asymmetry in the cross section of a moving object, such as a hot billet, having transverse as well as longitudinal movement, at successive points along the axis of longitudinal movement of said object, said cross section being perpendicular to the axis of said longitudinal movement, said method comprising arranging an image superposing mirror system having a plurality of spaced object mirrors, a single image mirror and intermediate mirrors arranged to superimpose the individual images produced by said object mirrors in a desired superimposed relation on said image mirror, with said object mirrors angularly spaced around the said axis of longitudinal movement of said object to view said object in a direction perpendicular to said axis of longitudinal movement, directing the optical axis of an object-side telecentric lens system towards said image mirror so that said superimposed images are reflected into said lens system along the optical axis thereof to provide a composite image of which the constituent parts each correspond to the dimension of said object in a direction perpendicular to the axis of longitudinal movement thereof as seen from a different one of the locations of said object mirrors, and gauging asymmetry from the relative sizes of the constituent parts of said composite image, whereby changes in distance of said object from said lens system in a direction transverse to said axis of longitudinal movement are ineffective to change the size of said constituent parts of said image and hence the degree of said asymmetry.

8. A method of measuring the sectional profile of a longitudinally moving object perpendicular to the axis of longitudinal movement thereof at successive points along such axis, said object having transverse as well as longitudinal movement, said method comprising directing the optical axis of an object-side telecentric lens system perpendicular to said axis of longitudinal movement to provide an image of opposite extremities of said object in a direction perpendicular to said axis of longitudinal movement, causing relative rotation between said lens system and said object whereby to produce a succession of images of said object as viewed from a succession of different points angularly spaced around said axis of longitudinal movement and lying in a plane perpendicular to such axis, and measuring the profile of said object from the succession of images thus formed, whereby changes in distance of said object from said lens system in a direction transverse to said axis of longitudinal movement are ineffective to change the profile of said composite image and hence are ineffective to introduce error into the measurements made.

References Cited in the file of this patent
UNITED STATES PATENTS

| | | |
|---|---|---|
| 2,464,793 | Cooke | Mar. 22, 1949 |
| 2,500,051 | Wolff | Mar. 7, 1950 |
| 2,552,280 | Hudak | May 8, 1951 |
| 2,607,267 | Fultz et al. | Aug. 19, 1952 |
| 2,812,685 | Vossberg | Nov. 12, 1957 |
| 2,854,887 | Lankes | Oct. 7, 1958 |

UNITED STATES PATENT OFFICE
CERTIFICATE OF CORRECTION

Patent No. 3,031,916                            May 1, 1962

Charles Burns

It is hereby certified that error appears in the above numbered patent requiring correction and that the said Letters Patent should read as corrected below:

Column 5, lines 35 and 36, strike out "object to provide an image of said object displaying the said".

Signed and sealed this 21st day of August 1962.

(SEAL)
Attest:

ESTON G. JOHNSON
Attesting Officer

DAVID L. LADD
Commissioner of Patents